United States Patent
Hakura et al.

(10) Patent No.: US 10,032,242 B2
(45) Date of Patent: Jul. 24, 2018

(54) MANAGING DEFERRED CONTEXTS IN A CACHE TILING ARCHITECTURE

(71) Applicant: NVIDIA Corporation, Santa Clara, CA (US)

(72) Inventors: Ziyad S. Hakura, Gilroy, CA (US); Jeffrey A. Bolz, Austin, TX (US); Amanpreet Grewal, Lancaster, NY (US); Matthew Johnson, Oviedo, FL (US); Andrei Khodakovsky, Belmont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 541 days.

(21) Appl. No.: 14/043,411

(22) Filed: Oct. 1, 2013

(65) Prior Publication Data

US 2014/0118363 A1    May 1, 2014
US 2017/0206623 A9    Jul. 20, 2017

Related U.S. Application Data

(63) Continuation-in-part of application No. 14/012,308, filed on Aug. 28, 2013, now Pat. No. 9,734,548.

(60) Provisional application No. 61/719,271, filed on Oct. 26, 2012.

(51) Int. Cl.
    *G06T 1/20*                 (2006.01)

(52) U.S. Cl.
    CPC ...................................... *G06T 1/20* (2013.01)

(58) Field of Classification Search
    None
    See application file for complete search history.

(56) References Cited

U.S. PATENT DOCUMENTS

| | | |
|---|---|---|
| 6,323,860 B1 | 11/2001 | Zhu et al. |
| 6,535,209 B1 | 3/2003 | Abdalla et al. |
| 6,697,063 B1 | 2/2004 | Zhu et al. |
| 7,102,646 B1 | 9/2006 | Rubinstein et al. |

(Continued)

OTHER PUBLICATIONS

Pinheiro, Rodrigo B., et al. "Introduction to Multithreaded rendering and the usage of Deferred Contexts in DirectX 11." SBC—Proceedings of SBGames(2011): 1-5.*

(Continued)

*Primary Examiner* — Ryan D McCulley
(74) *Attorney, Agent, or Firm* — Artegis Law Group, LLP

(57) ABSTRACT

A method for managing bind-render-target commands in a tile-based architecture. The method includes receiving a requested set of bound render targets and a draw command. The method also includes, upon receiving the draw command, determining whether a current set of bound render targets includes each of the render targets identified in the requested set. The method further includes, if the current set does not include each render target identified in the requested set, then issuing a flush-tiling-unit-command to a parallel processing subsystem, modifying the current set to include each render target identified in the requested set, and issuing bind-render-target commands identifying the requested set to the tile-based architecture for processing. The method further includes, if the current set of render targets includes each render target identified in the requested set, then not issuing the flush-tiling-unit-command.

20 Claims, 10 Drawing Sheets

(56) References Cited

U.S. PATENT DOCUMENTS

| | | |
|---|---|---|
| 7,170,515 B1 | 1/2007 | Zhu et al. |
| 8,605,102 B1 | 12/2013 | Purcell et al. |
| 2009/0058848 A1 | 3/2009 | Howson |
| 2010/0169608 A1 | 7/2010 | Kuo et al. |
| 2013/0063453 A1* | 3/2013 | Bloomfield et al. .......... 345/520 |
| 2014/0118379 A1* | 5/2014 | Hakura et al. ................ 345/557 |
| 2014/0327684 A1* | 11/2014 | Engh-Halstvedt ............ 345/506 |

OTHER PUBLICATIONS

Non-Final Office Action for U.S. Appl. No. 14/046,249 dated May 10, 2016.
Non-Final Office Action for U.S. Appl. No. 14/045,361 dated Feb. 26, 2016.

\* cited by examiner

MANAGING DEFERRED CONTEXTS IN A CACHE TILING ARCHITECTURE

CROSS-REFERENCE TO RELATED APPLICATIONS

This current application is a continuation-in-part of patent application Ser. No. 14/012,308, filed Aug. 28, 2013 and titled "Caching of Adaptively Sized Cache Tiles in a Unified L2 Cache with Surface Compression," which claims benefit of U.S. provisional patent application Ser. No. 61/719,271, filed Oct. 26, 2012 and titled "An Approach for Tiled Caching." This current application also claims benefit of U.S. provisional patent application Ser. No. 61/719,271, filed on Oct. 26, 2012 and titled "An Approach for Tiled Caching." The subject matter of these related applications is hereby incorporated herein by reference.

BACKGROUND OF THE INVENTION

Field of the Invention

Embodiments of the present invention relate generally to graphics processing and, more specifically, to managing deferred contexts in a cache tiling architecture.

Description of the Related Art

Some graphics subsystems implement a tiling architecture in which a render target is divided into partitions referred to as "tiles." Some tile-based systems also store data in an on-chip cache memory during rendering, which increases performance and reduces memory bandwidth consumption. For improved performance, multiple processing entities also may be implemented to process the tiles in parallel.

In operation, graphics processing subsystems may be aware of a specific set of render targets to which rendering work may be written. In the case of a tiling architecture, the tiling unit may be configured with certain settings based on the set of render targets. When the set of render targets is modified, the tiling unit may be required to stop accepting new work and process completely all work previously received before accepting any new work. Consequently, if the set of render targets is modified too often, then the interruptions experienced by the tiling unit may contribute to wasted processing time and a loss of efficiency.

Deferred contexts are a mechanism included in the DirectX 3D version 11 application programming interface (API) specification by which an application program may record command lists for transmission to a device driver for playback to a graphics processing subsystem at a later time. Each command list is assumed to begin with a fully cleared graphics processing subsystem state. Thus, the DirectX 3D API sends commands to the device driver to clear the graphics processing subsystem state after replaying each command list. This mechanism helps to facilitate application-level parallelism by allowing multiple concurrently running execution threads to record command lists for later playback. However, this mechanism also transmits many state reset commands, such as commands to reset the set of the render targets, to the graphics processing subsystem. In a tiling architecture, such a large number of state reset commands may cause the tiling unit to be interrupted quite often, leading to overall decreased system performance.

As the foregoing illustrates, what is needed in the art is a technique for efficiently managing state changes associated with deferred contexts.

SUMMARY OF THE INVENTION

One embodiment of the present invention sets forth a method for managing bind-render-target commands in a tile-based architecture. The method includes receiving a requested set of bound render targets and a draw command. The method also includes, upon receiving the draw command, determining whether a current set of bound render targets includes each of the render targets identified in the requested set. The method further includes, if the current set does not include each render target identified in the requested set, then issuing a flush-tiling-unit-command to a parallel processing subsystem, modifying the current set to include each render target identified in the requested set, and issuing bind-render-target commands identifying the requested set to the tile-based architecture for processing. The method further includes, if the current set of render targets includes each render target identified in the requested set, then not transmit the bind-render-target commands to the tile-based architecture.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
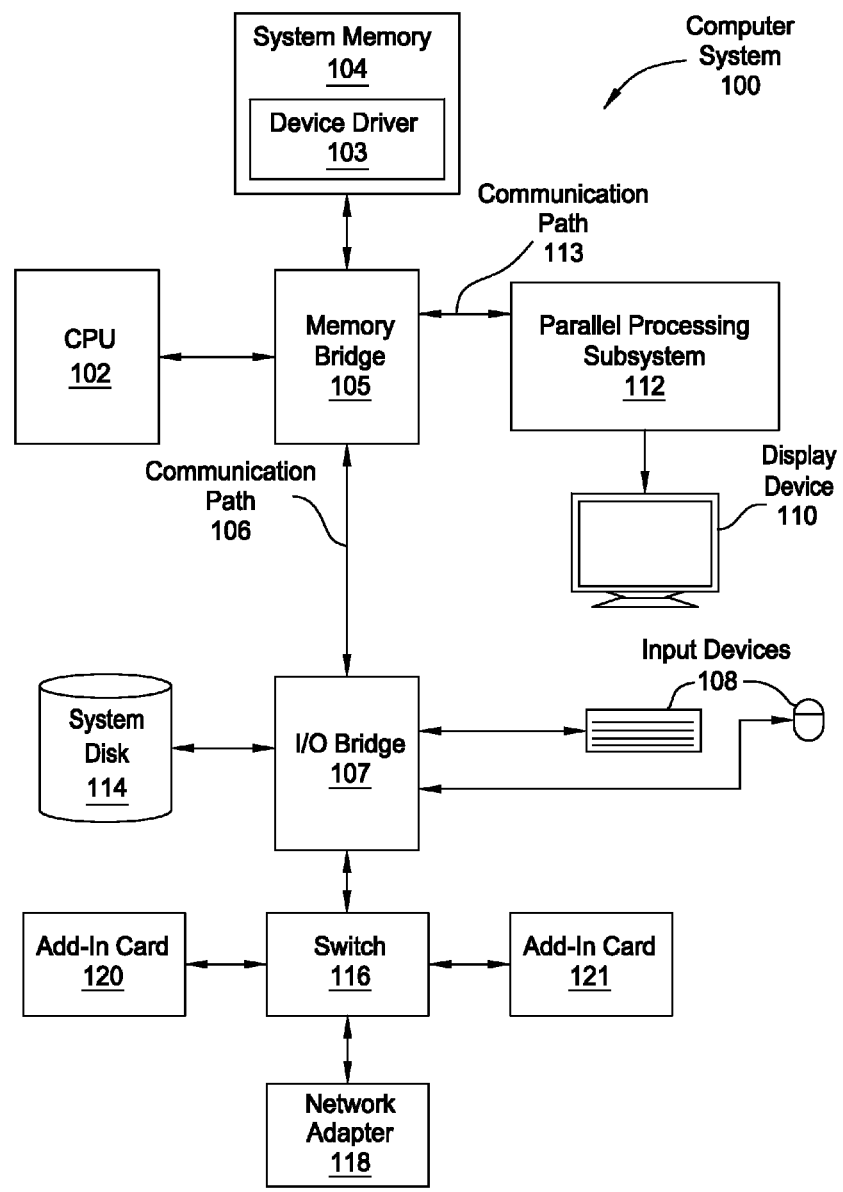
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
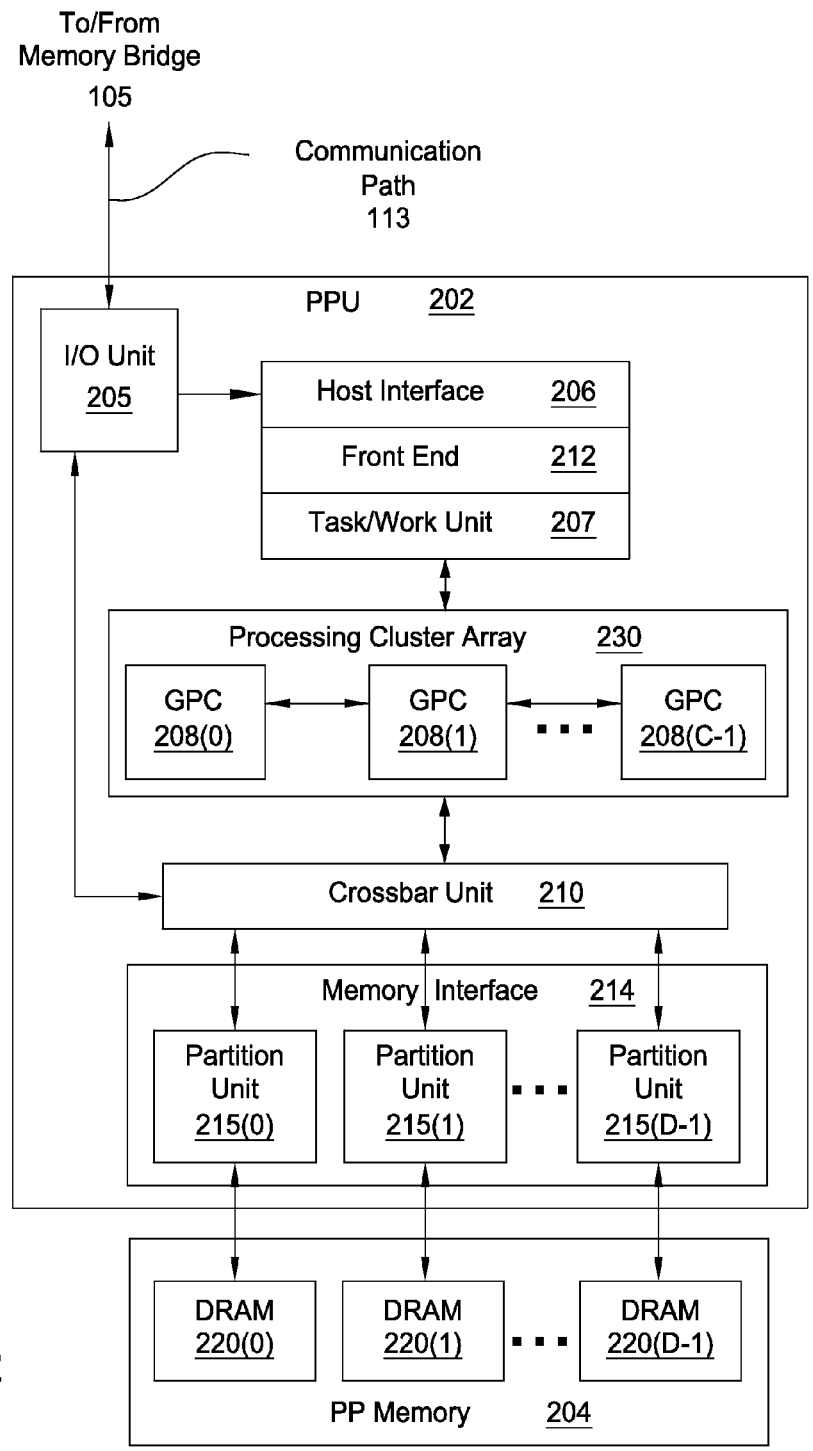
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
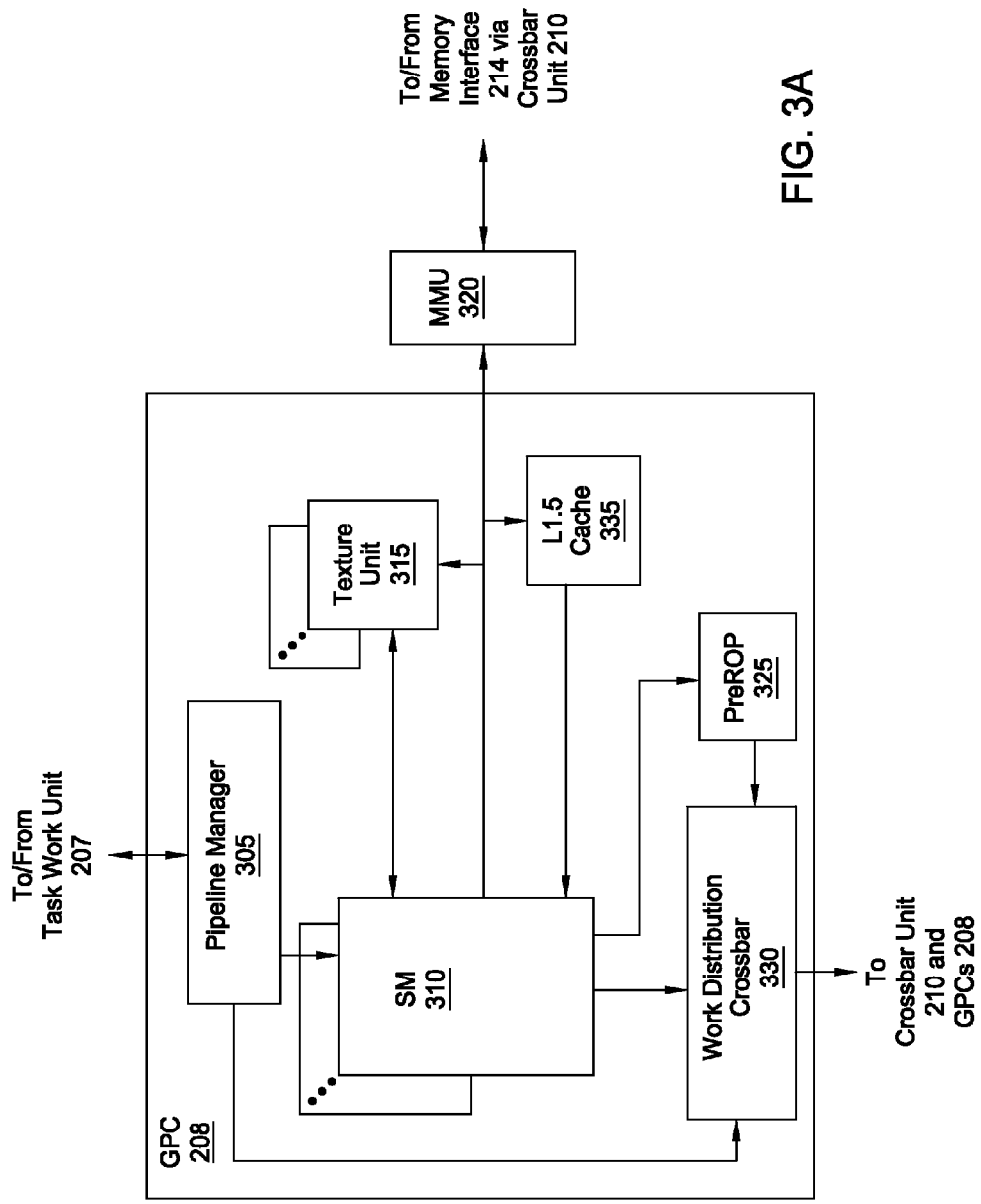
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units.

Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
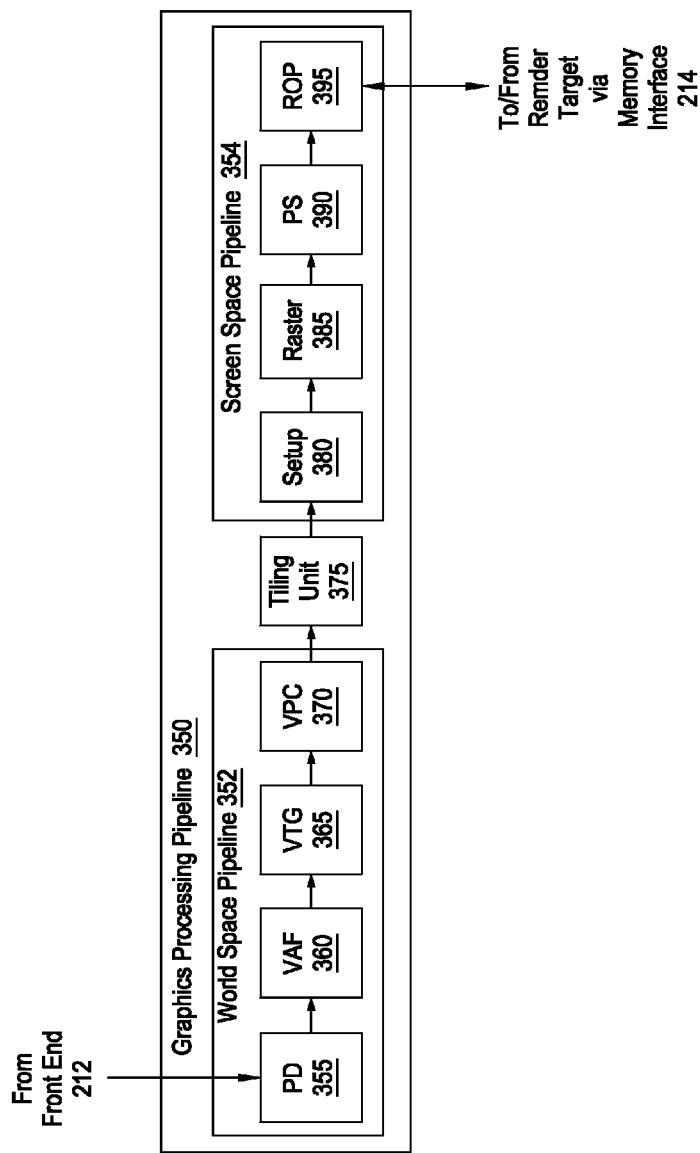
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
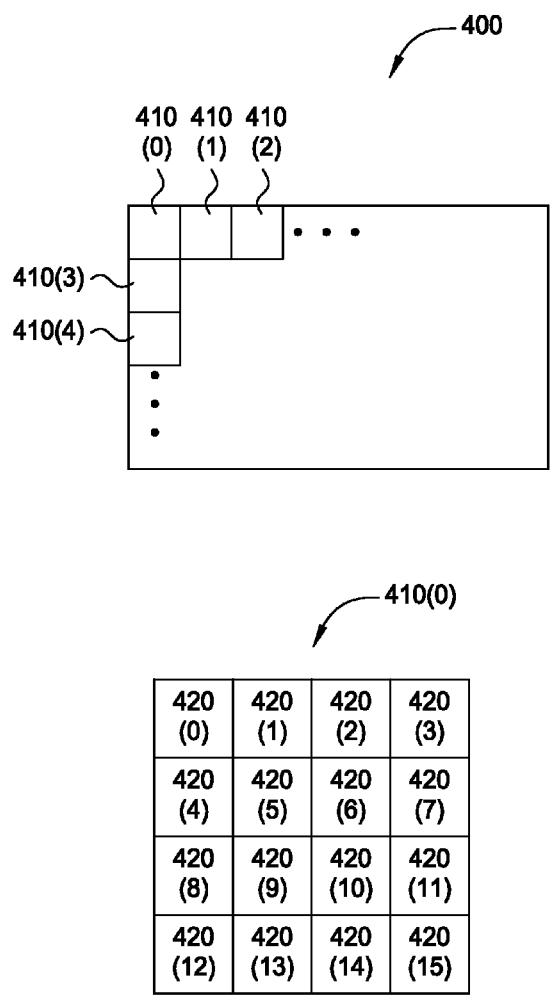
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Figure 5:
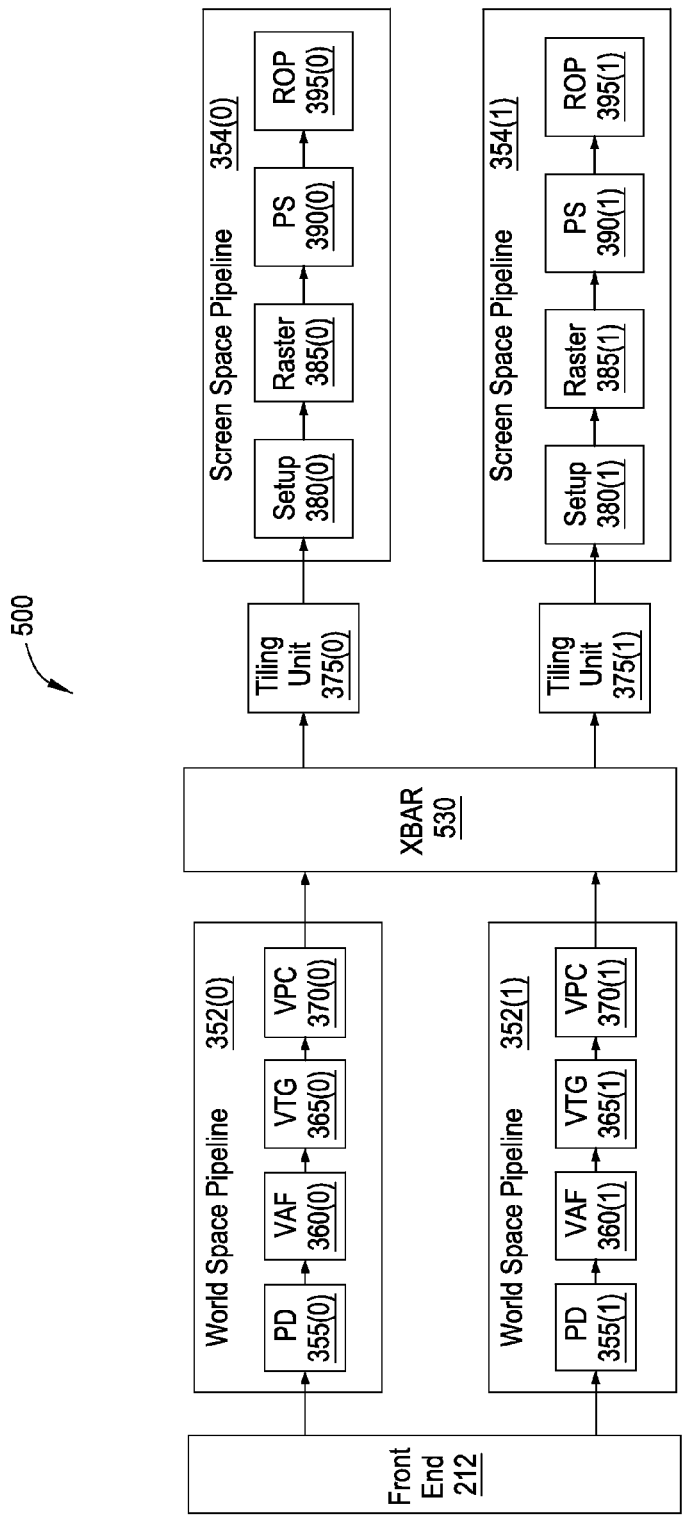
FIG. 5 is a block diagram of a graphics subsystem configured to implement cache tiling, according to one embodiment of the present invention.

FIG. 5 illustrates a graphics subsystem configured to implement cache tiling, according to one embodiment of the present invention. As shown, the graphics subsystem 500 includes a front end unit 212, a first world-space pipeline 352(0), a second world-space pipeline 352(1), a crossbar unit 530 ("XBAR"), a first tiling unit 575(0), a second tiling unit 575(1), a first screen-space pipeline 354(0), and a second screen-space pipeline 354(1).

The graphics subsystem 500 includes at least two instances of the screen-space pipeline 354 and the world-space pipeline 352, for increased performance. The graphics subsystem 500 also includes a crossbar unit 530 for transmitting work output from the first world-space pipeline 352(0) and the second world-space pipeline 352(1) to the first tiling unit 575(0) and the second tiling unit 575(1). Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5 functions in a similar manner as described above with respect to FIGS. 1-4.

A device driver 103 transmits instructions to the front end unit 212. The instructions include primitives and commands to bind render targets, arranged in application-programming-interface order (API order). API order is the order in which the device driver 103 specifies that the commands should be executed and is typically specified by an application executing on CPU 102. For example, an application may specify that a first primitive is to be drawn and then that a second primitive is to be drawn. The application may also specify that certain work is to be rendered to a particular render target, or that one or more render targets are to be bound.

When the front end unit 212 receives the instructions from the device driver 103, the front end unit 212 distributes tasks associated with the instructions to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the instructions to the first world-space pipeline 352(0) and tasks for a second batch of primitives associated with the instructions to the second world-space pipeline 352(1).

The first world-space pipeline 352(0) and second world-space pipeline 352(1) each process tasks associated with the instructions, and generate primitives for processing by the first screen-space pipeline 354(0) and the second screen-space pipeline 354(1). The first world-space pipeline 352 (0) and second world-space pipeline 352(1) each include a bounding box generator unit (not shown) that determines to which screen space pipeline—the first screen-space pipeline 354(0) or the second screen-space pipeline 354(1)—each primitive should be transmitted. To make this determination, the bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. A primitive may be transmitted to multiple screen-space pipelines 354 if the primitive overlaps raster tiles 420 associated with more than one screen-space pipeline 354. After the world-space pipelines 352 generate the primitives, the world-space pipelines 352 transmit the primitives to the crossbar unit 530, which transmits the primitives to the corresponding tiling units 375 as specified by the bounding box generator unit.

The tiling units 575 receive primitives from the crossbar unit 530. Each tiling unit 575 accepts and stores these primitives until the tiling unit 575 decides to perform a flush operation. Each tiling unit 575 decides to perform a flush operation when one or more resource counters maintained by the tiling units 575 indicates that a resource has exceeded a threshold. Each tiling unit 575 may also perform a flush operation upon receiving a command from upstream in the graphics processing pipeline 500 requesting that the tiling unit 575 perform a flush operation. Such a command is referred to herein as a "flush-tiling-unit command." The device driver 103 may transmit the flush-tiling-unit command to the graphics processing pipeline 500 in situations that the device driver 103 deems appropriate.

Upon receiving primitives, a tiling unit 575 updates several resource counters associated with the primitives. The resource counters are configured to track the degree of utilization of various resources associated with the primitives received by the tiling units 575. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 575. Each tiling unit 575 includes a primitive storage space that is maintained independently of primitive storage space for other tiling units 575. When a tiling unit 575 receives a primitive, some of the primitive storage space is occupied by the primitive. Because only a limited amount of primitive storage space exists for each tiling unit 575, exceeding a threshold amount of storage space in a particular tiling unit 575 causes the tiling unit 575 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 575 maintains a count of the amount of space occupied by circular buffer entries associated with primitives in the tiling unit 575.

In one embodiment, the vertex attribute circular buffer may be structured as a collection of smaller per-world-space-pipeline circular buffers. Each per-world-space-pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 575 performs a flush operation, the tiling unit 575 iterates through all of the cache tiles 410, and for each cache tile 410, generates a cache tile batch that includes primitives that overlap the cache tile 410, and transmits the cache tile batches to the associated screen-space pipeline 354. Each tiling unit 575 is associated with a different screen-space pipeline 354. Thus, each tiling unit 575 transmits cache tile batches to the associated screen-space pipeline 354.

The tiling unit 575 transmits these cache tile batches to the screen-space pipeline 354 associated with the tiling unit as the cache tile batches are generated. The tiling unit 575 continues to generate and transmit cache tile batches in this manner for all cache tiles 410 associated with a render target. In one embodiment, the tiling unit 575 determines which primitives overlap a cache tile 410 by comparing a border of the cache tile 410 with bounding boxes associated with the primitives and received from the bounding box unit.

The cache tile batches flow through the screen-space pipelines 354 in the order in which the tiling unit 575 generates the cache tile batches. This ordering causes the units in the screen-space pipelines 354 to process the primitives in cache tile order. In other words, the screen-space pipelines 354 process primitives that overlap a first cache tile, and then process primitives that overlap a second cache tile, and so on.

Conceptually, each cache tile batch can be thought of as beginning at the point in time at which the tiling unit 575 began accepting primitives after the previous flush operation. In other words, even though the cache tile batches are transmitted to and processed by the screen-space pipelines 354 sequentially, each cache tile batch logically begins at the same point in time. Of course, because the cache tiles generally do not overlap in screen space, sequential processing in this manner generally produces the desired results.

Managing Render Targets with Deferred Contexts

Various units in the graphics processing pipeline 500 may write color data, depth data, stencil data, or other types of data to one or more buffers in memory. Several different buffers that the graphics processing pipeline 500 writes to may exist, and the graphics processing pipeline 500 may write different data to the different buffers. More specifically, rendering work flowing through the graphics processing pipeline 500 may specify a render target identifier (render target ID). The pixel data produced as a result of rendering such work is written to a render target specified by the render target ID. Each render target ID is associated with a different buffer in memory. The buffer that is associated with any given render target ID may be altered. The device driver 103 alters the buffer that is associated with a particular render target ID by transmitting a command to the graphics processing pipeline 500 to "bind" the render target ID to a particular memory location. In one embodiment, the device driver 103 binds a render target ID to a memory location by specifying a particular memory address that is to be associated with a given render target ID. A memory buffer that is bound to a particular render target ID is referred to herein as a "render target."

More than a single render target may be bound at any given time. The number of render targets that are bound may affect how cache tiles are processed in the tiling unit 575. For this reason, the device driver 103 is configured to recalculate the cache tile size and to instruct the graphics processing pipeline 500 to change the cache tile size in some instances where the render targets that are bound change. The term cache tile size refers to the proportion of any particular render target that is deemed to be associated with one cache tile. The term cache tile size also refers to the size of a cache tile in the cache memory. Further, the device driver 103 is also typically configured to transmit to the graphics processing pipeline 500 an instruction to flush the tiling unit 575 in some instances in which the render targets that are bound change.

The device driver 103 does not always recalculate the cache tile size and issue an instruction to flush the tiling unit 575 when the bound render targets change. Instead, the device driver 103 is configured to determine when recalculating the cache tile size and flushing the tiling unit 575 is appropriate.

One approach to determining when to alter the cache tile size and flush the tiling unit 575 would be to alter the cache tile size and flush the tiling unit 575 every time the requested set of bound render targets is changed. However, such an approach may lead to certain inefficiencies, such as, for example, with deferred contexts. Deferred contexts are a mechanism included in the DirectX 3D 11 specification by which an application program may record command lists for transmission to a device driver 103 for playback to a graphics processing subsystem 500 at a later time.

Under the DirectX 3D specification, each command list is assumed to begin with a fully cleared state for the graphics processing pipeline 500. A "fully cleared state" means that the graphics processing pipeline 500 does not include any bound render targets, and means that other state information is cleared as well. The DirectX 3D API sends commands to the device driver 103 to clear the state of the graphics processing pipeline 500 after replaying each command list. This mechanism helps to facilitate application-level parallelism by allowing multiple concurrently running threads to record command lists for later playback. Because each command list is assumed to be executed beginning with a completely cleared graphics processing pipeline 500 state, the concurrently running threads do not need to have knowledge of the graphics pipeline state at any point in time.

However, because the DirectX 3D API transmits state reset commands at the end of each command list, the device driver 103 receives many such state reset commands. In typical operation, the state reset commands are followed by commands that bring the state back to an original configuration. In other words, in typical operation, an application program requests that the state be cleared, and then resets the state back to original values (i.e., the values prior to the state being cleared), simply to comply with the requirements of deferred contexts. If the device driver 103 were to process all of these state change commands as specified by the DirectX 3D API calls, then the device driver 103 would transmit a large number of commands to flush the tiling unit 575, which could lead to inefficiencies in tiling unit operation 575. FIGS. 6-9 present techniques for managing render target bindings in the graphics processing pipeline 500 in a more efficient manner.

Figure 6:
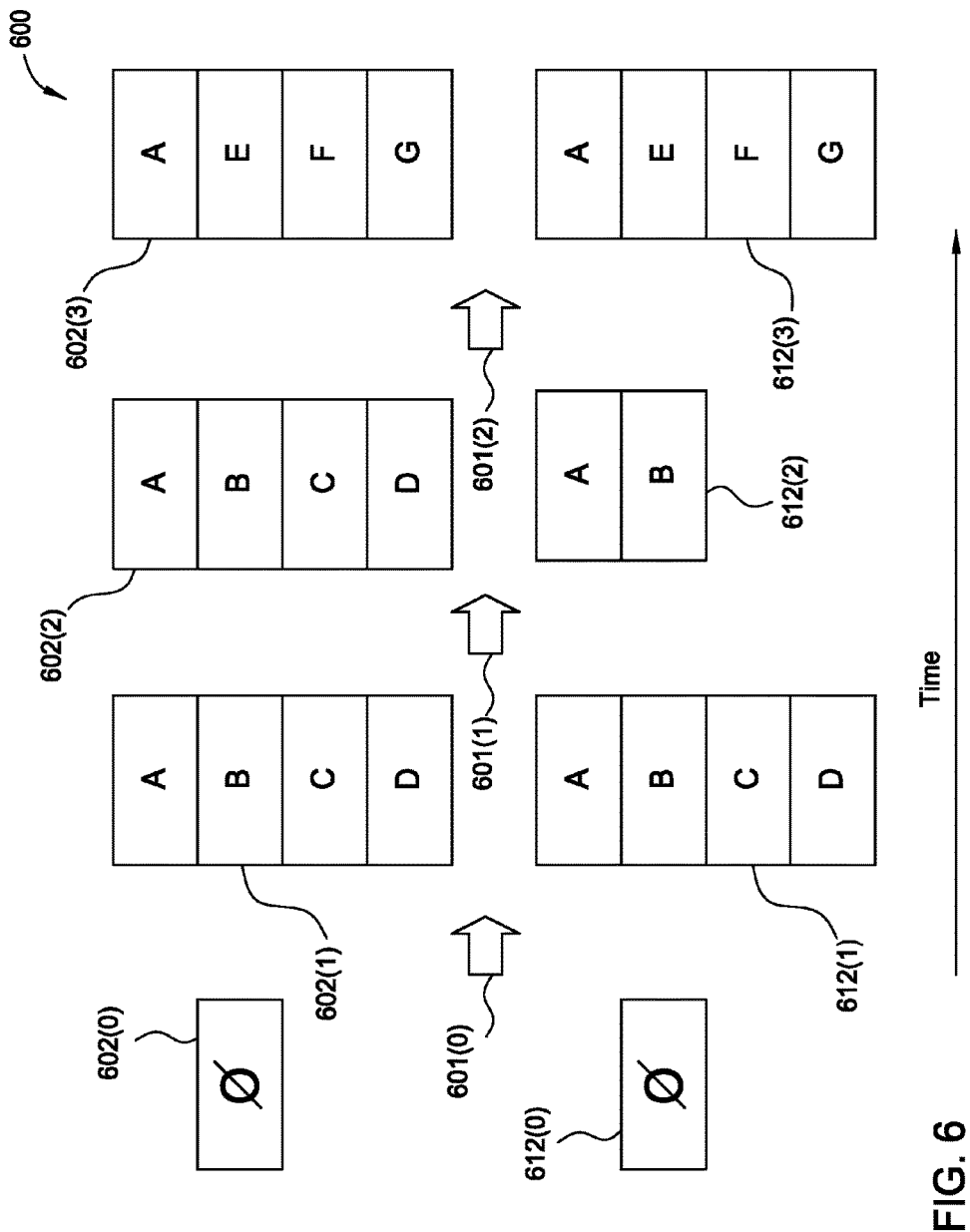
FIG. 6 is a conceptual illustration of transitions between different current sets and requested sets, according to one embodiment of the present invention.

FIG. 6 is a conceptual illustration of a sequence 600 of transitions between bound render target configurations, according to one embodiment of the present invention. As shown, the sequence 600 of transitions includes current sets of render targets 602, requested sets of render targets 612, and transitions 601. The device driver 103 keeps track of the current set of bound render targets 602 ("current set") and a requested set of bound render targets 612 ("requested set"). The device driver 103 receives requests to bind render targets ("bind requests") from an application program. The device driver 103 continues to receive the bind requests until the device driver 103 receives a draw command. When the device driver 103 receives a draw command, the device driver 103 evaluates the current set 602 against the requested set 612. More specifically, the device driver 103 determines whether the requested set 612 is a subset of the current set 602. The requested set 612 is a subset of the current set 602 if all render targets included in the requested set 612 are also included in the current set 602.

In some embodiments, the device driver 103 determines whether the requested set is an ordered subset of the current set. The requested set is an ordered subset of the current set if all render targets included in the requested set are also included in the current set, in order. To determine if the requested set is an ordered subset of the current set, the device driver 103 iterates through each of the render targets in the requested set. The device driver 103 first determines whether the first target in the requested set is included in the current set. If the first target is not included, then the requested set is not an ordered subset of the current set. If the first target is included, then the device driver 103 remembers the position of the render target identical to the first target in the current set. For each subsequent render target in the requested set, the device driver 103 determines whether the subsequent render target is included in the current set at a position that is after the remembered position of a previously found render target. If all render targets in the requested set are included in the current set in this ordered manner, then the requested set is an ordered subset of the current set.

In other embodiments, the device driver 103 stores the current set as a packed array. In other words, the device driver 103 maintains an array that includes pointers to all render targets, where all elements in the array, up to the end of the array, are occupied by a pointer. In some embodiments, the array can store up to eight color render targets and one render target for depth/stencil. In some embodiments, each element of the array includes a base address for a particular memory buffer.

FIG. 6 is a conceptual illustration of transitions 601 between several different current sets 602 and requested sets

612. At each transition 601, the device driver 103 receives one or more draw commands, and may perform other work not associated with render targets. Initially, that is, prior to the first transition 601(0), a current set 602(0) has no render targets, as indicated by the "null" symbol. In this example, the current set 602(0) is empty because the application program has just started, and no render targets have yet been bound. The requested set 612(0) is also empty, since there have been no requests to bind any render targets. After the first transition, the application program requests that render targets in a first requested render target set 612(1) be bound. First requested set includes render targets "A," "B," "C," and "D." The device driver 103 determines that the current set 602(0) does not include at least one render target included in the requested set 612(1), and updates the current set to current set 602(1), which includes all render targets in requested set 612(1).

Subsequently, a second transition 601(1) occurs, and the application program requests another requested set 612(2) be bound. The requested set 612(2) includes render targets "A," and "B." Because render targets "A" and "B" are included in the current set 602(1), the requested set 612(2) is a subset of the current set 602(1), and the device driver 103 does not update the current set. The current set 602(2) is thus the same as the current set 602(1). After another transition 601(2), the application program requests that another set of render targets, requested set 612(3) be bound. Because the requested set 612(3) includes at least one render target that is not included in current set 602(2) (all of render targets "E," "F," and "G"), the device driver 103 modifies the current set 602(3) to include all render targets in the requested set 612(3), and the device driver 103 transmits commands to the graphics processing pipeline 500 to bind the render targets included in requested set 612(3), and to cause the tiling unit 575 to perform a flush operation.

Figure 7:
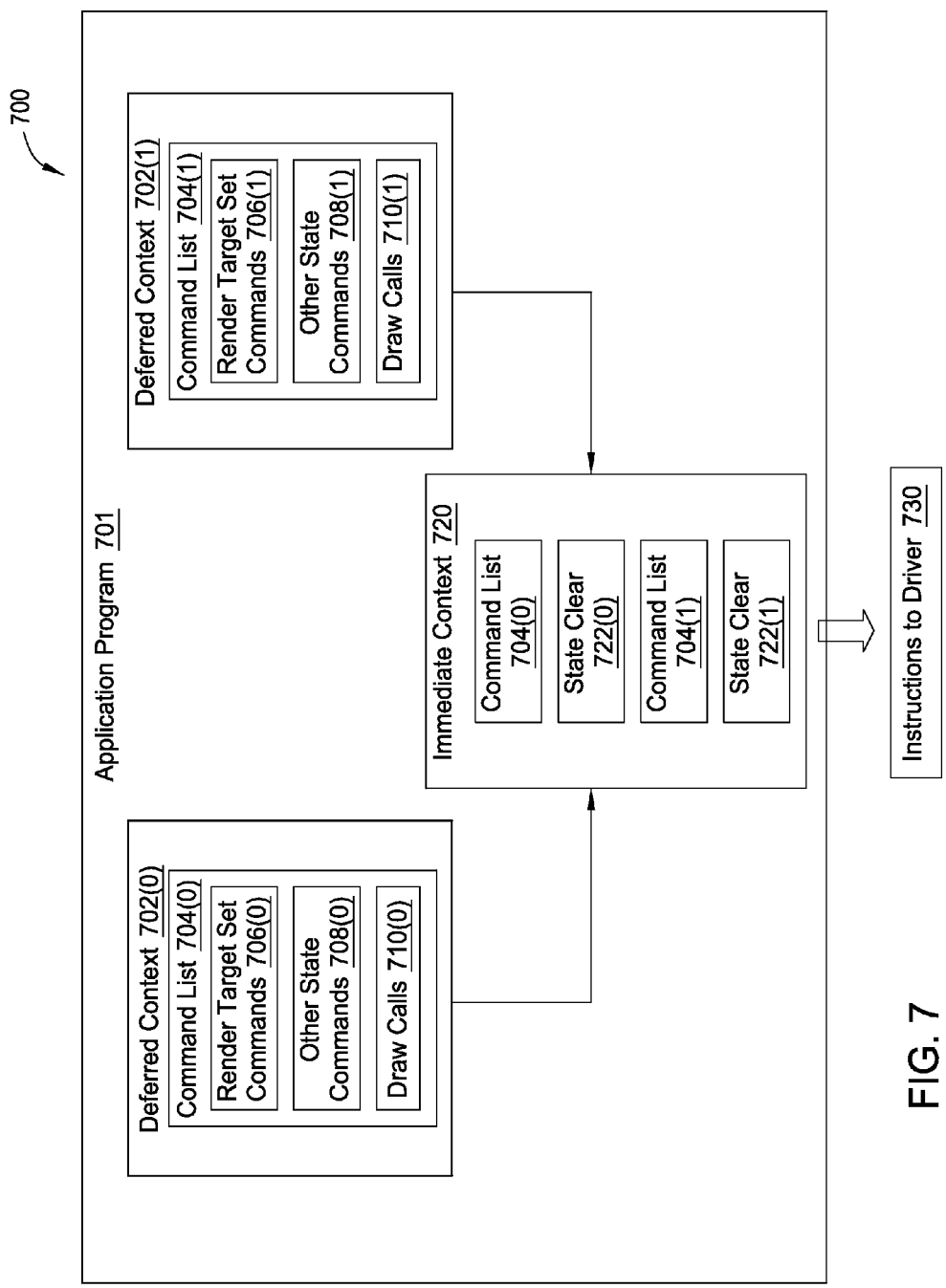
FIG. 7 is a block diagram of an application program that includes an immediate context and deferred contexts, according to one embodiment of the present invention.

FIG. 7 is a block diagram of an application program 701 that includes an immediate context and deferred contexts, according to one embodiment of the present invention. The application program 701 is software executing on CPU 102. Among other items not shown, the application program 701 includes deferred contexts 702 and an immediate context 720. The application program 701 creates command lists 704 that each includes bind-render-target commands 706, other state commands 708, and draw calls 710. Each command list 704 represents work that the application program 701 requests the graphics processing pipeline 500 to perform. For example, the command list 704 may include draw calls, which are requests to draw primitives.

To cause the graphics processing pipeline 500 to perform the work associated with a command list 704, the application program 701 first assembles a command list 704 within a deferred context 702 and then requests the immediate context 720 to render the work associated with the command list 704. The immediate context 720 assembles command lists 704 received from deferred contexts and inserts state clears 722 in between each command list 704. The state clears 722 are configured to cause the graphics processing pipeline to, among other things, unbind all render targets, and clear other state information associated with the graphics processing pipeline 500. Because render targets are unbound after each command list 704 in the immediate context 720, each command list 704 includes commands to bind render targets 706.

Figure 8:
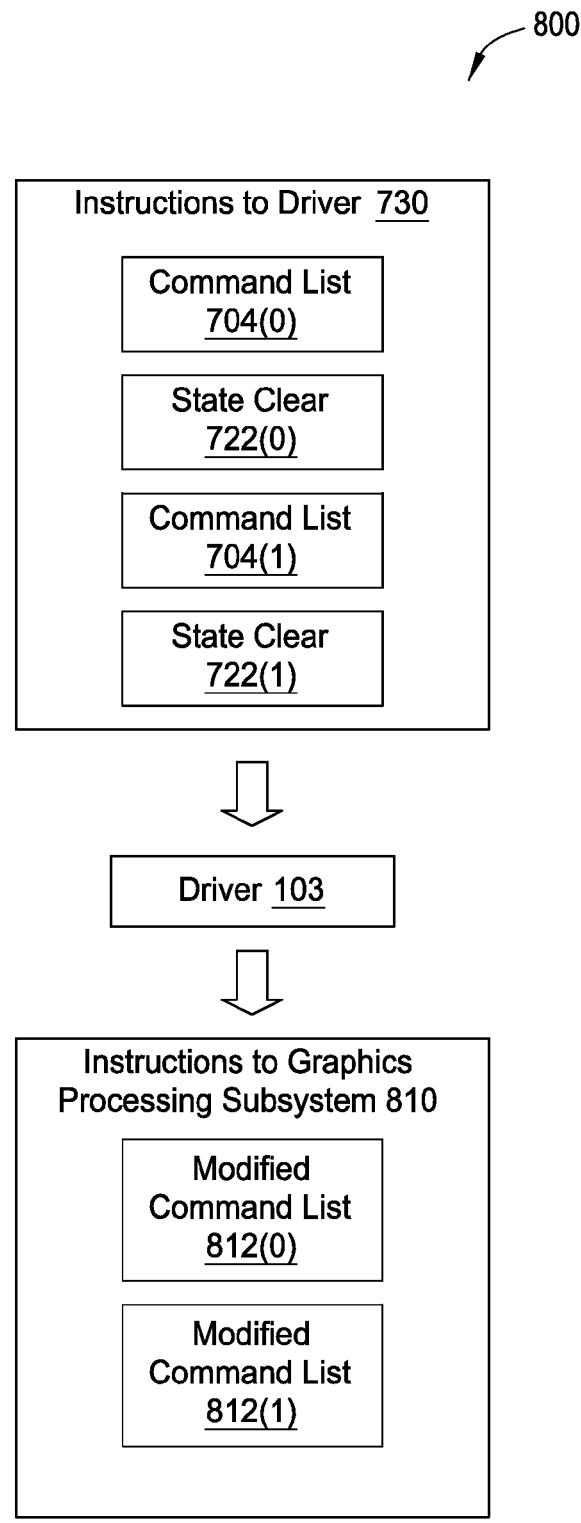
FIG. 8 conceptually illustrates the device driver of FIG. 7 in operation, according to one embodiment of the present invention.

FIG. 8 conceptually illustrates the device driver of FIG. 7 in operation, according to one embodiment of the present invention. The instructions 730 transmitted to the device driver 103 from the immediate context 720 include the command lists 704 and state clears 722 generated by the immediate context 720. The state clears include instructions to unbind all render targets. Additionally, the command lists 704 include instructions to bind render targets as specified by the application program 701. In typical operation, sequences of command lists 704 and state clears 722 include instructions to unbind all render targets, and then to simply rebind the same render targets again. Sometimes, however, different render targets are bound. When the device driver 103 receives instructions to bind or unbind render targets, the device driver 103 determines whether the render targets requested to be bound are a subset of the currently bound render targets. The trigger for determining whether the render targets requested to be bound are a subset of the currently bound render targets is when the device driver 103 receives a first draw call after receiving the requests to bind render targets. Waiting for the first draw call provides the device driver 103 with an opportunity to accumulate multiple requests to bind render targets.

If the requested set 612 of render targets is not a subset of the current set 602 of bound render targets, then the device driver 103 issues an instruction to flush the tiling unit 575 to the graphics pipeline 500. Additionally, the device driver 103 issues instructions to bind all of the render targets in the set of received render targets. If the render targets are a subset of the currently bound render targets, then the device driver does not issue an instruction to flush the tiling unit 575 to the graphics processing pipeline 500.

With typical operation of deferred contexts 702, each command list 704 transmitted by a deferred context 702 includes an instruction to clear the set of bound render targets and then to set the bound render targets again. Typically, such commands to clear and reset the render target commands with deferred contexts have little to no purpose other than to facilitate the scheme of deferred contexts. If each of the commands to clear and reset the render targets were to cause the tiling unit 575 to flush, a large amount of unnecessary overhead would be incurred. Thus, not flushing the tiling unit 575 in instances associated with deferred contexts 702 prevents such overhead from being incurred.

In operation, the device driver 103 receives the instructions 730 to driver. The instructions 730 to driver include the command lists 704 and state clears 722. The command lists 704 each include commands to bind render targets, and the state clears 722 include commands to unbind all render targets. In the example depicted in FIG. 8, the first command list 704(0) and the second command list 704(1) each include commands to bind the same render targets as each other, and as a command list immediately previous to the first command list 704(0), which is not shown. When processing the command lists 704, the device driver 103 detects that the requests to bind render targets in the first command list 704(0) and the second command list 704(1) specify render targets that were all included in the current list associated with the immediately previous command list. The device driver 103 includes the state clears 722 and the command lists in the modified command lists 812. Additionally, the device driver 103 detects that the state clears 722 include instructions to set the bound render targets to NULL (i.e., no render targets bound), which is a subset of the currently bound render targets. Therefore, the device driver 103 does not include a command to flush the tiling unit 575 in the modified command lists 812. The device driver 103 thus outputs instructions 810 to graphics processing subsystem that include modified command lists 812.

Figure 9:
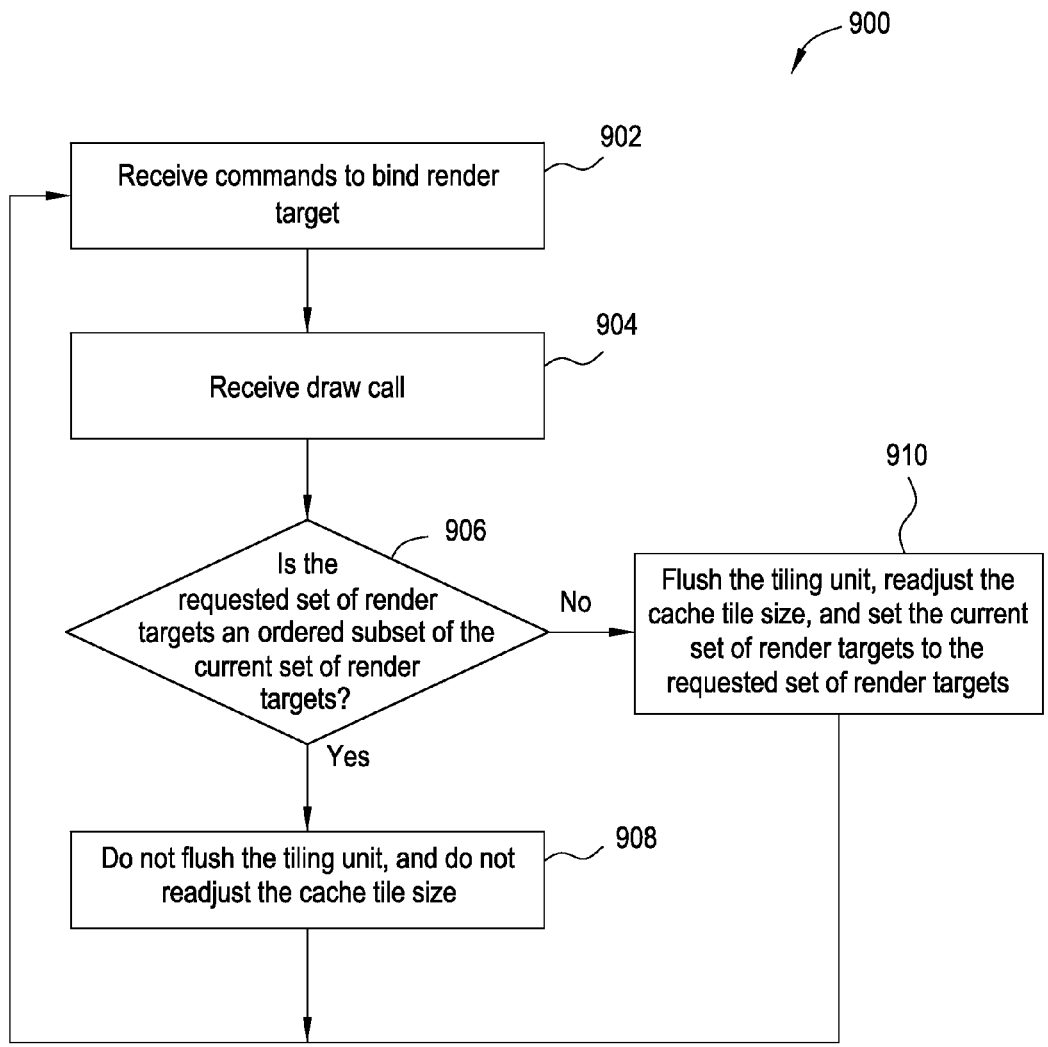
FIG. 9 is a flow diagram of method steps for managing deferred contexts in a tile-based architecture, according to one embodiment of the present invention.

FIG. 9 is a flow diagram of method steps for managing deferred contexts in a tile-based architecture, according to one embodiment of the present invention. Although the method steps are described in conjunction with the system of FIGS. 1-8, persons skilled in the art will understand that any system configured to perform the method steps, in any order, falls within the scope of the present invention.

As shown, a method 900 begins in step 902, where the driver 103 receives commands to bind one or more render targets from an application program 701. In step 904, the device driver 103 receives a draw call. In step 906, the device driver 103 determines whether the set of requested render targets is a subset of the currently bound render targets. If the set of requested render targets is a subset of the currently bound render targets, then the method proceeds to step 908.

In step 908, the driver 103 forgoes transmitting a command to the graphics processing pipeline 500 to flush the tiling unit 575. After step 910, the method returns to step 902. Returning to step 906, if the device driver 103 determines that the set of requested render targets is not a subset of the currently bound render targets, then the method proceeds to step 910. In step 910, the device driver 103 transmits a command to flush the tiling unit 575 to the graphics processing pipeline 500, transmits commands to bind the render targets as specified by the requested set of render targets, and updates the current set of bound render targets to be equal to the requested set of bound render targets.

In sum, a device driver receives rendering work from an application program that includes rendering work to be executed by a graphics processing subsystem. The rendering work includes commands to unbind all render targets and commands to bind a requested set of render targets as well as one or more draw commands. When the driver receives a draw command, the driver compares the requested set of render targets to a current set of render targets. If the requested set is a subset of the current set of render targets, then the driver does not transmit a flush-tiling-unit-command to the graphics processing subsystem. If the requested set includes at least one render target not included in the current set, then the driver transmits a flush-tiling-unit-command to the graphics processing subsystem.

One advantage of the disclosed approach is that inefficiencies associated with flushing the tiling unit due to resetting the currently bound set of render targets too frequently are avoided. Another advantage is that inefficiencies associated with resizing cache tiles too frequently are avoided.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for managing bind-render-target commands in a tile-based architecture, the method comprising:
    receiving a requested set of bound render targets;
    receiving a draw command;
    in response to receiving the draw command, comparing the requested set of bound render targets to a current set of bound render targets to determine whether the requested set of bound render targets comprises an ordered subset of the current set of bound render targets; and
    in response to the comparison indicating that the requested set of bound render targets does not comprise an ordered subset of the current set of bound render targets, issuing a flush-tiling-unit-command to the tile-based architecture, or
    in response to the comparison indicating that the requested set of bound render targets does comprise an ordered subset of the current set of bound render targets, not issuing the flush-tiling-unit-command to the tile-based architecture.

2. The method of claim 1, wherein:
    the current set includes each render target identified in the requested set, and
    not recalculating a cache tile size.

3. The method of claim 1, wherein:
    the current set does not include each render target identified in the requested set, and
    further comprising recalculating a cache tile size.

4. The method of claim 3, wherein recalculating the cache tile size comprises recalculating the cache tile size based on a number of render targets included in the requested set.

5. The method of claim 1, wherein the requested set is received from an immediate context included in an application program.

6. The method of claim 5, wherein the immediate context is configured to receive one or more command lists from one or more deferred contexts included in the application program.

7. The method of claim 6, wherein the immediate context is configured to insert one or more state clears after each of the one or more command lists.

8. The method of claim 7, wherein the one or more state clears include commands to unbind all render targets.

9. A non-transitory computer-readable medium for managing bind-render-target commands in a tile-based architecture, the non-transitory computer-readable medium comprising instructions that, when executed by a processor, cause the processor to:
    receive a requested set of bound render targets;
    receive a draw command;
    in response to receiving the draw command, comparing the requested set of bound render targets to a current set of bound render targets to determine whether the requested set of bound render targets comprises an ordered subset of the current set of bound render targets; and
    in response to the comparison indicating that the requested set of bound render targets does not comprise an ordered subset of the current set of bound render targets, issuing a flush-tiling-unit-command to the tile-based architecture, or in response to the comparison indicating that the requested set of bound render targets does comprise an ordered subset of the current set of bound render targets, not issuing the flush-tiling-unit-command to the tile-based architecture.

10. The computer-readable medium of claim 9, wherein:
the current set includes each render target identified in the requested set, and
the computer-readable medium further comprises instructions that, when executed by the processor, cause the processor to not recalculate a cache tile size.

11. The computer-readable medium of claim 9, wherein:
the current set does not include each render target identified in the requested set, and
the computer-readable medium further comprises instructions that, when executed by the processor, cause the processor to recalculate a cache tile size.

12. The computer-readable medium of claim 11, wherein the instructions cause the processor to recalculate the cache tile size based on a number of render targets included in the requested set.

13. The computer-readable medium of claim 9, wherein the requested set is received from an immediate context included in an application program.

14. The computer-readable medium of claim 13, wherein the immediate context is configured to receive one or more command lists from one or more deferred contexts included in the application program.

15. The computer-readable medium of claim 14, wherein the immediate context is configured to insert one or more state clears after each of the one or more command lists.

16. The computer-readable medium of claim 15, wherein the one or more state clears include commands to unbind all render targets.

17. A system for managing bind-render-target commands in a tile-based architecture, the system comprising:
a memory that stores a device driver; and
a processor that is coupled to the memory and, when executing the device driver, is configured to:
receive a requested set of bound render targets;
receive a draw command;
in response to receiving the draw command, compare the requested set of bound render targets to a current set of bound render targets to determine whether the requested set of bound render targets comprises an ordered subset of the current set of bound render targets; and
in response to the comparison indicating that the requested set of bound render targets does not comprise an ordered subset of the current set of bound render targets, issue a flush-tiling-unit-command to the tile-based architecture, or
in response to the comparison indicating that the requested set of bound render targets does comprise an ordered subset of the current set of bound render targets, not issue the flush-tiling-unit-command to the tile-based architecture.

18. The system of claim 17, wherein:
the current set includes each render target identified in the requested set, and
the processor is further configured to not recalculate a cache tile size.

19. The system of claim 17, wherein:
the current set does not include each render target identified in the requested set, and
the processor is further configured to recalculate a cache tile size.

20. The system of claim 17, wherein the processor is configured to recalculate a cache tile size based on a number of render targets included in the requested set.

* * * * *